United States Patent [19]
Haferl

[11] 3,794,754
[45] Feb. 26, 1974

[54] PAL-TYPE COLOR SIGNAL PROCESSING APPARATUS

[75] Inventor: Peter Eduard Haferl, Adliswil, Switzerland

[73] Assignee: RCA Corporation, New York, N.Y.

[22] Filed: May 8, 1972

[21] Appl. No.: 251,390

[30] Foreign Application Priority Data

May 7, 1971 Great Britain .................... 13857/71

[52] U.S. Cl. ..... 178/5.4 P, 178/5.4 SY, 178/5.4 SD
[51] Int. Cl. .............................................. H04n 9/44
[58] Field of Search ..... 178/5.4 P, 5.4 SY, 69.5 CB, 178/5.4 HE

[56] References Cited

UNITED STATES PATENTS

| | | | |
|---|---|---|---|
| 2,766,321 | 10/1956 | Parker | 178/69.5 LB |
| 2,766,321 | 10/1956 | Parker | 178/69.5 CB |

OTHER PUBLICATIONS

G. N. Patchett; Color Television with Particular Reference to the PAL System; 1967; pages 146–147, Figure 12.9

Z. Wiencek; "Automatic Controls for Color Television;" Electronics; May 15, 1959, pages 58–59.

*Primary Examiner*—Robert L. Richardson
*Attorney, Agent, or Firm*—E. M. Whitacre; W. H. Meagher

[57] ABSTRACT

Burst components of PAL-type encoded signal are retained with modulated subcarrier components as they are processed in 1H delay line assembly and delivered to respective demodulators. Reference oscillation phase to which R-Y demodulator responds is effectively reversed every other line, in response to PAL switch apparatus, in order to provide desired R-Y output in successive lines. Reference oscillation phase to which B-Y demodulator responds is alternated by quadrature switch apparatus between B-Y phase (applied throughout each line interval) and R-Y phase (applied during each inter-line blanking interval). A first gating circuit, coupled to the output of the B-Y demodulator, selects that portion of the B-Y demodulator output developed during the burst interval for passage to integrating and amplifying means in order to develop an AFPC voltage for phase control of the local reference oscillator. A second gating circuit, coupled to the output of the R-Y demodulator, selects that portion of the R-Y demodulator output developed during the burst interval for passage to ACC and color killer circuitry. During color operation (enabled state of bandpass chrominance amplifier) the ACC circuiry develops a control current from the second gating circuit output that adjusts the chrominance amplifier gain in a direction appropriate to maintaining burst amplitude substantially constant at a level set by a manual chroma control. The color killer enables the chrominance amplifier for color operation only when the gated R-Y output indicates by its amplitude the presence of a burst in the received signal and by its polarity the correct switching mode for the PAL switch. Unless such circumstances are present, the color killer disables the chrominance amplifier during each line interval; the killer is keyed, however, to enable the chrominance amplifier during each burst interval so that recovery from the disable state may be effected when appropriate. The color killer circuitry also passes a reset pulse to the PAL switch in the absence of a correct mode indication in the gated R-Y output. The color killer circuitry further serves to control the effectiveness of a subcarrier trap for the receiver's luminance channel, removing the trap during line intervals of monochrome operation.

7 Claims, 4 Drawing Figures

PAL-TYPE COLOR SIGNAL PROCESSING APPARATUS

This invention relates generally to color television signal processing systems, and, particularly, to novel and improved systems for processing color television signals of the PAL type.

In a color television receiver responding to a PAL transmission, the video signal output of the receiver's video detector includes, in addition to a wideband luminance component, a chrominance component in the form of a modulated subcarrier, and representing the summation of (*a*) the sideband products of the modulation of a subcarrier wave of fixed frequency and a first given phase by blue color-difference (B-Y) signals, and (*b*) the sideband products of the modulation of a subcarrier wave of the same fixed frequency, but with a quadrature phase relation to the first given phase, by red color difference (R-Y) signals, the second phase, however, being shifted by 180° in successive line intervals. The video signal, moreover, includes a color synchronizing burst component occurring during the interline blanking interval, incorporated in the transmission with a fixed amplitude and fixed (subcarrier) frequency, but alternating in phase in successive blanking intervals ±45° about a −(B-Y) phase (thereby corresponding to the summation of a fixed amplitude, constant-phase −(B-Y) burst component and a line-by-line phase reversing R-Y burst component of comparable fixed amplitude).

In a widely used approach to the processing of such detector PAL signals, the following functions are performed: A bandpass chrominance channel provides frequency selective amplification of the subcarrier sideband components, to the exclusion of low frequency luminance signals. The selectively amplified signals are applied to a 1H delay line assembly to develop two outputs respectively corresponding to an additive combination of undelayed and delayed signals, and a subtractive combination of undelayed and delayed signals. One output (in which the B-Y components for successive line intervals reinforce, whereas the R-Y components for successive line intervals mutually cancel) is supplied to a B-Y demodulator, while the other output (in which the R-Y components for successive line intervals reinforce, whereas the B-Y components for successive line intervals mutually cancel) is supplied to a R-Y demodulator. Each demodulator functions as a synchronous detector, controlled by the application of the appropriate phase of subcarrier frequency oscillations of fixed amplitude from a local reference oscillator. The reference phase applied to the B-Y demodulator is constant line-to-line, whereas the reference phase applied to the R-Y demodulator is shifted by 180° in successive line intervals. A takeoff for the burst component of the received signal is provided at a point in the chrominance channel prior to the delay line assembly, with appropriately gated apparatus extracting the burst component alone for amplification and delivery to a phase detector for comparison with an output of the local reference oscillator. An AFPC control voltage derived from the phase detector serves to lock the oscillator in a fixed phase relationship to the average phase of the "swinging" burst. Information derived from the separated burst is also used in performance of color killer and automatic chroma control (ACC) functions (determining the enabling or disabling of the chrominace channel, and the relative gain thereof when enabled). The burst component is eliminated from the chrominance signal delivered to the delay line assembly.

In accordance with the principles of the present invention, novel approaches to PAL color signal processing are contemplated which depart, in many regards, from the above-described widely used approach. Pursuant to the principles of the present invention, burst separation prior to delay is not effected, a separate burst amplifying channel and separate AFPC phase detector are not employed, and burst suppression is not effected for the signal delivered to the 1H delay line assembly. Rather, the burst is retained in the signal delivered to the 1H delay line assembly, and the respective B-Y and R-Y components of the burst pass to the respective demodulators. The B-Y demodulator then serves a dual function: as the B-Y demodulator during line intervals, and as an AFPC Phase detector during interline burst intervals. The phase of reference oscillations supplied to the B-Y demodulator is switched from its normal B-Y phase to an R-Y phase between line intervals, so that the polarity of the demodulator output during a burst interval is indicative of the direction of departure from correct phase relationship between local oscillator and incoming signal. A gating circuit, coupled to the output of the B-Y demodulator, selects that portion of the B-Y demodulator output developed during the burst interval for passage to an integrating and amplifying means in order to develop an AFPC voltage to control the local reference oscillator.

In accordance with further aspects of the present invention, the R-Y demodulator also serves a dual function: as the R-Y demodulator during line intervals, and as a synchronous in-phase detector of burst amplitude during the inter-line burst intervals. A second gating circuit, coupled to the output of the R-Y demodulator, selects that portion of the R-Y demodulator output developed during the burst interval for passage to automatic chroma control (ACC) and color killer circuitry. During color operation (enabled state of bandpass chrominance amplifier) the ACC circuitry develops a control current from the second gating circuit output that adjusts the chrominance amplifier gain in a direction appropriate to maintaining burst amplitude substantially constant at a level set by a manual chroma control. The color killer enables the chrominance amplifier for color operation only when the gated R-Y output indicates by its amplitude the presence of a burst in the received signal and by its polarity the correct switching mode for the PAL switch (i.e., for the reference phase reversing switch associated with the R-Y demodulator). Unless such circumstances are present, the color killer disables the chrominance amplifier during each line interval; the killer is keyed, however, to enable the chrominance amplifier during each interline interval so that recovery from the disabled state may be effected when appropriate.

In accordance with still further aspects of the present invention, the color killer circuitry may serve several additional functions, viz.: (*a*) passing a reset pulse to the PAL switch apparatus, in the absence of a correct mode indication in the gated R-Y output (so that PAL switching mode synchronization may be realized; and (*b*) controlling the effectiveness of a subcarrier trap for the receiver's luminance channel, removing the trap during line intervals of monochrome operation.

An object of the present invention is to provide novel and improved signal processing apparatus for PAL-type color television signals.

Other objects and advantages of the present invention will be readily apparent to those skilled in the art upon a reading of the following detailed description and an inspection of the accompanying drawings in which.

Figure 1:
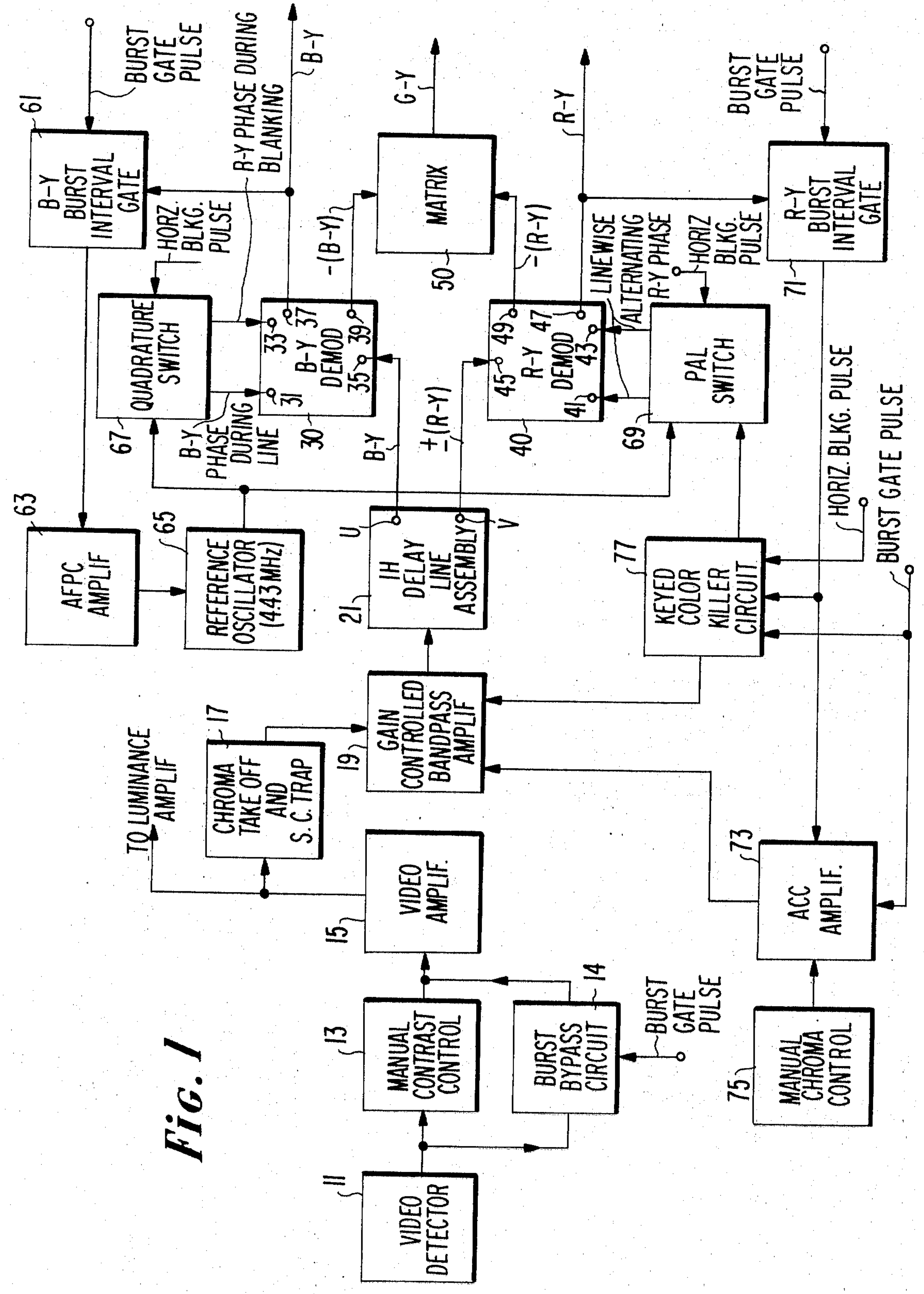
FIG. 1 is a block diagram illustration of a portion of a color television receiver incorporating color signal processing apparatus embodying the principles of the present invention.

In FIG. 1, a portion of a PAL color television receiver, incorporating an embodiment of the present invention, is illustrated. The video detector 11 recovers a PAL encoded signal from the output of the receiver's intermediate frequency amplifier (not illustrated). The detector output is applied to a video amplifier 15 via a manual contrast control 13, which is bypassed by a burst circuit 14.

The manual contrast control 13 provides a facility for adjustment of the peak-to-peak magnitude of the video signals delivered to amplifier 15; however, the bypass circuit 14 permits the color synchronizing burst component to pass to amplifier 15 without being affected by contrast control adjustment. This arrangement ensures that contrast control adjustment does not introduce an undesired change in saturation of the image colors; i.e., the contrast control provides concomitant adjustments of the luminance and chrominance components, but does not disturb the burst component amplitude (to which subsequent ACC circuitry is responsive).

The output of video amplifier 15 is applied to a wide-band luminance channel, including a luminance amplifier (not illustrated), and also, via chroma takeoff circuitry 17, to a chrominance channel, including a gain controlled bandpass amplifier 19. The chroma takeoff circuitry 17 provides a frequency selective input for the chrominance channel, passing the color subcarrier sideband components, to the substantial exclusion of low frequency luminance components; the chroma takeoff circuitry 17 also functions as a subcarrier trap for the luminance channel, significantly reducing the response of the luminance channel to signal frequencies in the vicinity of the color subcarrier. Desirably, the effectiveness of the trapping function is controlled as a function of whether the signal received is a monochrome or color transmission, with trapping eliminated in the former instance; the manner in which such trapping control is effected with be subsequently described.

The output of bandpass amplifier 19 is supplied to a 1H delay line assembly 21, which provides a pair of outputs representing additive and subtractive combinations of delayed and undelayed signals. At output terminal U of the delay line assembly 21, a combination is provided in which the B-Y components of succesive lines reinforce, whereas the shifting R-Y components tend to cancel; this output is supplied to an input terminal (35) of a B-Y demodulator 30. At a second output terminal (V) of the delay line assembly 21, a signal combination is provided in which the R-Y components of successive lines reinforce, whereas the B-Y components tend to cancel; this output is supplied to an input terminal (45) of an R-Y demodulator 40.

Each of the demodulators 30 and 40 function as a synchronous detector, heterodyning the respective delay line assembly output with unmodulated reference oscillations, of subcarrier frequency and respectively appropriate phase. Illustratively, each demodulator is of a type having (1) a pair of output terminals at which appear respective opposite polarity versions of the color-difference signal product of demodulation, and (2) a pair of reference oscillation input terminals with opposing effects on the polarity of the demodulator outputs.

The source of reference oscillations for the demodulators is reference oscillator 65, operating at the subcarrier frequency (e.g., 4.43 MHz.) and subject to phase control in a manner to be described. An output of oscillator 65 is applied to a quadrature switch 67, controlled by a horizontal blanking pulse input, the switch serving to alternately deliver (*a*) reference oscillations in a B-Y phase (during each line interval to reference input terminal 31 of demodulator 30, and (*b*) reference oscillations in a R-Y phase (during each inter-line blanking interval) to reference input terminal 33 of demodulator 30.

The B-Y component output of delay line assembly 21 is thus subject to in-phase synchronous detection during each line interval to a provide a B-Y color-difference signal output at terminal 37, and a −(B-Y) color-difference signal output at terminal 39.

At this point, it is appropriate to note that the color synchronizing burst portion of the video signal amplified in video amplifier 15 has been retained with the line interval subcarrier sideband components throughout the chrominance channel (17, 19, 21). The constant phase −(B-Y) component of the swinging burst thus appears in the signal output at delay line assembly terminal U. This component, accordingly, is subject to quadrature synchronous detection in demodulator 30, in view of the delivery by quadrature switch 67 of reference oscillations in the R-Y phase to the (inverting) reference input terminal 33.

B-Y demodulator 30 thereby conveniently serves as the equivalent of the burst phase detector employed in the usual AFPC arrangement. A B-Y burst interval gate 61, activated by an appropriately timed burst gate pulse, is coupled to output terminal 37, and serves to pass the portion of the demodulator output developed during the burst interval, i.e., the result of phase detection of the −(B-Y) burst component, to an AFPC amplifier 63. An integrated and amplified version of the gated output, with amplitude and polarity respectively indicative of degree and direction of departure from correct phase relationship between oscillator and received signal, is supplied by amplifier 63 to a suitable phase control element of oscillator 65.

Reference oscillations in the R-Y phase are delivered in a linewise alternating fashion from the PAL switch apparatus 69, controlled by a horizontal blanking pulse input, to the respective reference input terminals (noninverting terminal 41 and inverting terminal 43) of R-Y demodulator 40. If the switching mode of the PAL switch 69 is the correct one, the alternating polarity line interval R-Y component at terminal V of delay line assembly 21 will be subject to in-phase detection by demodulator 40 in the desired fashion, developing a R-Y color-difference signal at output terminal 47, and a −(R-Y) color-difference signal at output terminal 49. The latter output signal is supplied, along with the −(B-Y) output of demodulator 30, to a matrix circuit 50, for development of a third (G-Y) color-difference signal.

An R-Y burst component also appears in the signal input to terminal 45 of the R-Y demodulator 40, and is subject to in-phase synchronous detection when the correct switching mode is in effect. An R-Y burst interval gate 71, coupled to output terminal 47 of demodulator 40, is gated by a suitably timed burst gate pulse to pass that portion of the R-Y demodulator output developed during the burst interval to a pair of circuits (ACC amplifier circuit 73 and keyed color killer circuit 77).

The ACC (automatic chroma control) circuitry 73 functions to integrate and amplify the gated R-Y demodulator output in order to develop a control current for controlling the gain of bandpass amplifier 19. The gain control is effected in a direction to oppose spurious variations in the amplitude of the R-Y burst component (which is transmitted with fixed amplitude), thereby to minimize spurious variations in the chrominance signal amplitude that may result in incorrect saturation (chroma) of the displayed image colors. A facility for manual adjustment of the saturation of the image colors is provided in the form of a manual chroma control 75, which supplies an adjustable reference potential to ACC amplifier 73 for comparison with the gated R-Y demodulator output from gate 71 to determine the control current magnitude.

The keyed color killer circuit 77 controls the enabling and disabling of the bandpass amplifier 19, responding to the amplitude and polarity of the gated R-Y demodulator output from gate 71. The amplifier 19 is enabled, permitting amplification thereby of the line interval subcarrier sideband components, when the gate 71 output amplitude indicates presence of a color transmission with a burst of adequate amplitude for synchronization, and when gate 71 output polarity indicates operation of the PAL switch in the correct switching mode. In the absence of such circumstances, the color killer circuit 77 holds the amplifier in a disabled state; the color killer circuit is, however, keyed in response to a horizontal blanking pulse input in a manner enabling operation of the amplifier 19 during the burst interval to ensure the ability of the system to recover from the disabled state when appropriate. Alteration of the PAL switch operation to a correct mode is also facilitated by the keyed color killer circuit 77, which permits passage of a reset pulse to the PAL switch apparatus, when circuit 77 holds amplifier 19 in a disabled state.

The keyed color killer circuit 77 also serves the previously mentioned trap switching function, causing circuit 17 to be effective as a subcarrier trap for the luminance channel when amplifier 19 is enabled, and to be ineffective as a subcarrier trap when amplifier 19 is disabled.

Figure 2:
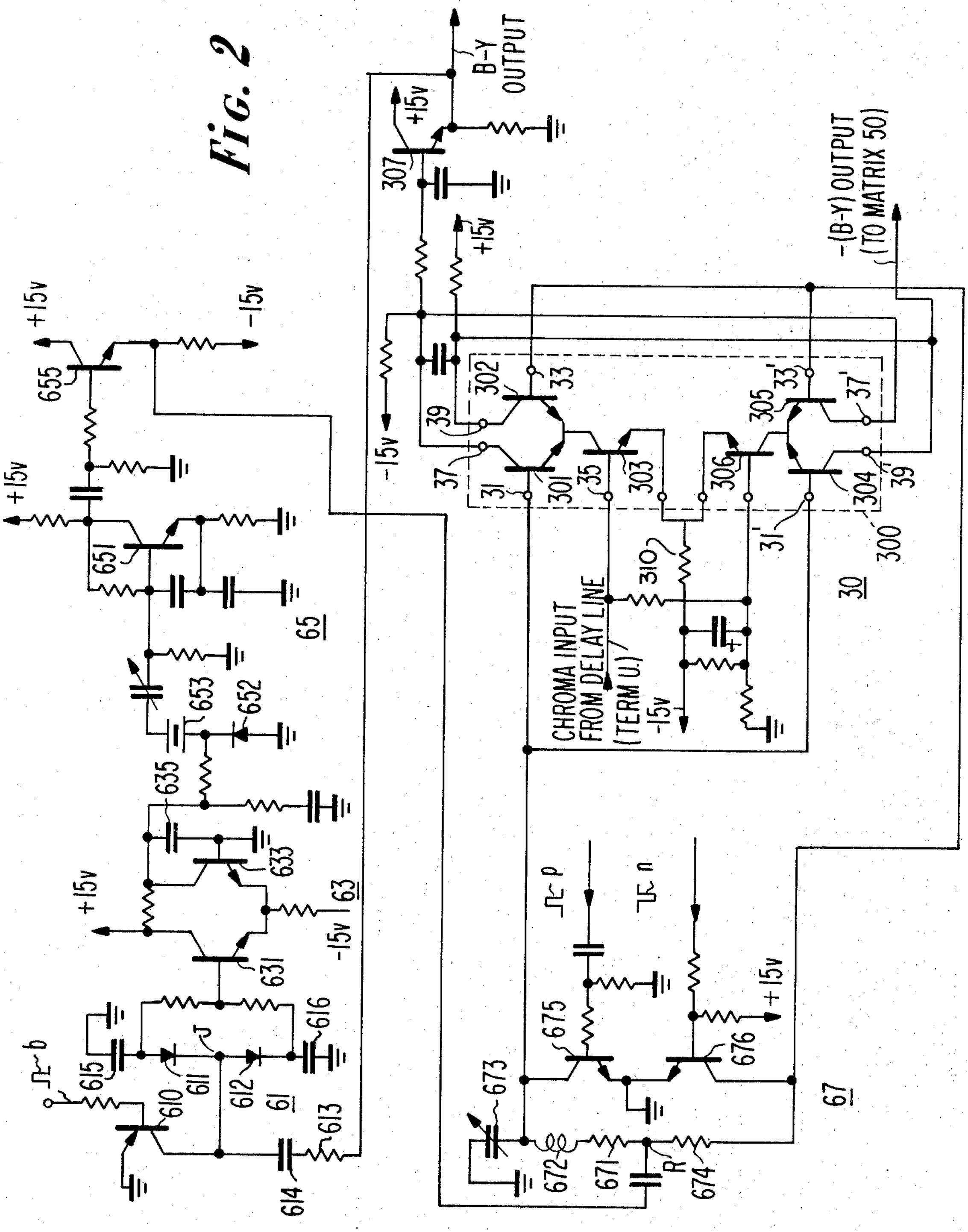
FIG. 2 depicts schematically illustrative apparatus for performing the AFPC function in the system of FIG. 1.

FIG. 2 provides, in schematic detail, an illustration of particular circuit arrangements that may advantageously be employed for portions of the FIG. 1 system (and in particular, those portions associated with oscillator synchronization: B-Y demodulator 30, B-Y burst interval gate 61, AFPC amplifier 63, reference oscillator 65, and quadrature switch 67).

The B-Y demodulator 30 in FIG. 2 employs six transistors (301, 302, 303, 304, 305 and 306 conveniently realized in integrated form on a common monolithic integrated circuit chip 300) arranged in a cross-coupled differential amplifier pair configuration. In the circuit arrangement, the emitters of transistors 301 and 302 are joined directly and returned to a bias supply (e.g., − 15 volts) via the collector-emitter path of transistor 303 and emitter resistor 310; likewise, the emitters of transistors 304 and 305 are joined directly and returned to the bias supply via the collector-emitter path of transistor 306 and the common emitter resistor 310.

The base of transistor 301 serves as the non-inverting reference input terminal 31 of the demodulator; the base (terminal 31') of transistor 304 is directly linked thereto. The base of transistor 302 serves as the inverting reference input terminal 33 of the demodulator the base (terminal 33') of transistor 305 is directly linked thereto. The collector of transistor 301 serves as the B-Y color-difference signal output terminal 37 of the demodulator; the collector (terminal 37') of transistor 305 is directly linked thereto. The collector of transistor 302 serves as the −(B-Y) color-difference signal output terminal 39 of the demodulator; the collector (terminal 39') of transistor 304 is directly linked thereto.

The base of transistor 303 serves as the modulated subcarrier input terminal 35 of the demodulator, receiving the signals appearing at terminal U of the delay line assembly 21 (FIG. 1). The base of transistor 306 is effectively held at AC ground potential by suitable bypassing.

The signal output appearing at terminal 37, free of subcarrier frequency components due to cancellation effects from the contributing transistors (301, 305), is applied to emitter follower transistor 307. A B-Y color-difference signal output is available at the emitter of transistor 307 for combination with a luminance component in the matrix and display portion of the receiver (not illustrated).

The emitter of transistor 307 is also linked by a path including resistor 613 and capacitor 614 to the junction (J) of oppositely poled electrodes of a pair of diodes 611 and 612. The collector-emitter path of a gate transistor 610 short circuits junction J to ground throughout each line interval. During each burst interval, however, the short circuit is removed, as transistor 610 is cut off by the positive-going pulse portion *b* of a gating waveform applied to its base. The cutoff of transistor 610 during each burst interval permits conduction by one of the diodes (611 or 612, depending upon the polarity of the burst interval output of demodulator 30) to charge the respectively associated capacitor (615 or 616) to a level dependent upon the magnitude of the burst interval output of demodulator 30. Transistor 610 and associated circuitry thus performs the function of the B-Y burst interval gate 61 of the FIG. 1 system.

AFPC amplifier 63 includes a pair of transistors 631 and 633 disposed in a differential amplifier configuration, with the base of input transistor 631 coupled to respond to the potential across the charged capacitor (615 or 616). The integrated output of amplifier 63 appears across capacitor 635, coupled between the collector of output transistor 633 and ground.

Reference oscillator 65 employs a transistor 651 associated with reactive circuit elements in a Colpitts configuration, with the inductive circuit branch including a frequency determining crystal 653 in series with a variable capacitance diode 652. A resistor links the collector of AFPC amplifier output transistor 633 to the junction of crystal 653 and diode 652, whereby the reverse bias on diode (and hence its capacitance) is subject to variation in accordance with the integrated output of amplifier 63 in order to effect the desired frequency and phase synchronization.

The output of reference oscillator 65 is derived from the collector of transistor 651 and applied via an emitter follower transistor 655 to a reference oscillation feed point R. Quadrature switch apparatus 67 controls the application of reference oscillations from feed point R to respective reference input terminals of the B-Y demodulator 30.

Quadrature switch 67 employs a pair of switching transistors 675 and 676. Switching transistor 676 is normally conducting, but is cut off during each inter-line blanking interval by the neagive-going pulse portion *n* of a gating waveform applied to its base. In complementary fashion, switching transistor 675 is rendered conducting only during the inter-line blanking interval by the positive going pulse portion *p* of a gating waveform applied to its base.

The collector-emitter path of switching transistor 676 is connected between the demodulator reference input terminal 33 and ground, while the collector-emitter path of switching transistor 675 is connected between the demodulator reference input terminal 31 and ground. A resistor 674 links feed point R to reference input terminal 33. A resistor 671 in series with a coil 672 links feed point R to reference input terminal 31. A capacitor 673 is connected between reference input terminal 31 and ground, and is adjusted for series resonance with coil 672 at the reference oscillation frequency.

during each line interval, the conduction of switching transistor 676 short circuits reference input terminal 33 to ground, precluding the feeding of reference oscillations to that terminal. Switching transistor 675, however, is nonconducting each line interval, permitting the feeding of reference oscillations to terminal 31. Circuit elements 672 and 673 introduce a phase shift of 90° from the R-Y phase to which the oscillator output is held, so that the reference oscillations delivered during line intervals are at the B-Y phase.

During each inter-line blanking interval, the conduction of switching transistor 675 short circuits reference input terminal 31 to ground, precluding the feeding of reference oscillations to that terminal. Switching transistor 676, however, is nonconducting during each inter-line blanking interval, permitting the feeding of reference oscillations to terminal 33 in the R-Y phase.

Figure 3:
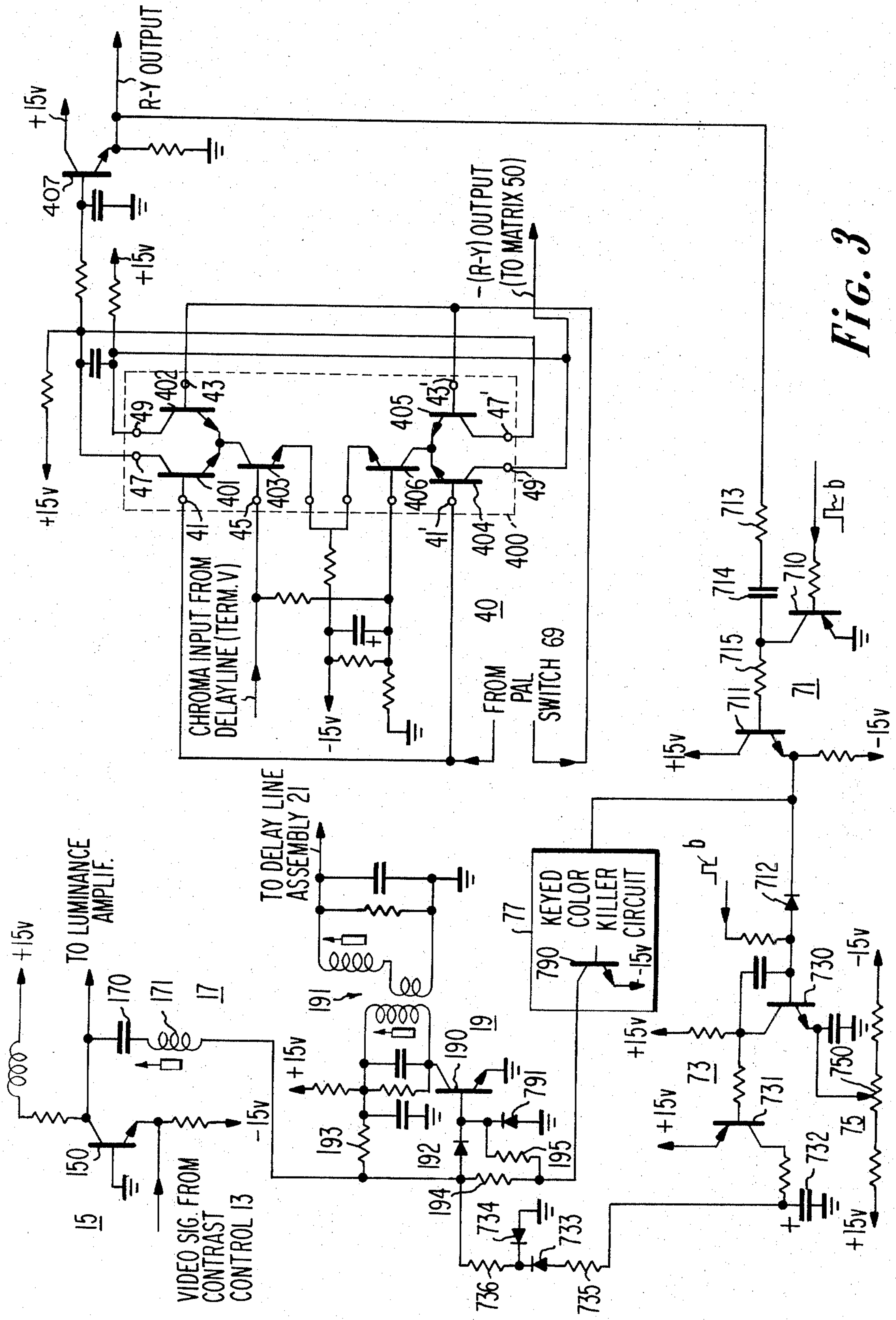
FIG. 3 depicts schematically illustrative apparatus for performing the ACC function in the system of FIG. 1.

FIG. 3 provides, in schematic detail, an illustration of particular circuit arrangements that may advantageously be employed for additional portions of the FIG. 1 system (particularly, those portions associated with automatic chroma control: R-Y demodulator 40, R-Y burst interval gate 71, ACC amplifier 73, manual chroma control 75, video amlifier 15, chroma takeoff 17, and bandpass amplifier 19).

The R-Y demodulator 40 employs six transistors (401, 402, 403, 404, 405 and 406) disposed on a monolithic integrated circuit chip 400, and arranged in a cross-coupled differential amplifier configuration identical to that previously explained for the B-Y demodulator 30.

The base of transistor 401 serves as the non-inverting reference input terminal 41 of the demodulator, the base (terminal 41′) of transistor 404 is directly linked thereto. The base of transistor 402 serves as the inverting reference input terminal 43 of the demodulator; the base (terminal 43′) of transistor 405 is directly linked thereto. The collector of transistor 401 serves as the R-Y color-difference signal output terminal 47 of the demodulator; the collector (terminal 47′) of transistor 405 is directly linked thereto. The collector of transistor 402 serves as the −(B-Y) color-difference signal output terminal 49 of the demodulator; the collector (terminal 49′) of transistor 404 is directly linked thereto.

The base of transistor 403 serves as the modulated subcarrier input terminal 45 of the demodulator, receiving the signals appearing at terminal V of delay line assembly 21 (FIG. 1). The base of transistor 406 is effectively held at AC ground potential by suitable bypassing.

The signal output appearing at terminal 47, free of subcarrier frequency components, is applied to emitter follower transistor 407. An R-Y color-difference signal output is derived from the emitter of transistor 407. A path, including, in series, a resistor 713, capacitor 714 and resistor 715 is also provided between the emitter of transistor 407 and the base of an additional emitter follower transistor 711. The emitter-collector path of a gating transistor 710 is connected between ground and the junction of capacitor 714 and resistor 715; the junction is short circuited to ground throughout each line interval by the conducting gate transistor 710. During each burst interval, however, the short circuit is removed, as transistor 710 is cut off by the positive-going pulse portion *b* of a gating waveform applied to its base. The cutoff of transistor 710 during each burst interval permits emitter follower transistor 711 to respond to the burst interval portion of the output of demodulator 40. Transistor 710 and associated circuitry thus performs the function of the R-Y burst interval gate 71 of the FIG. 1 system.

An output of emitter follower transistor 711 is applied to the keyed color killer circuit 77 (for which a detailed showing will appear in the subsequently described FIG. 4). ACC amplifier 73 responds to another output of emitter follower transistor 711 in a manner to be now described.

ACC amplifier 73 includes a pair of cascaded amplifier stages incorporating transistors 730 and 731. The emitter of the ACC input transistor is connected to the adjustable tap of a potentiometer 750, the end terminals of which are connected to respective bias supply terminals of opposite polarity (e.g., −15 volts and + 15 volts). The base of ACC input transistor 730 is connected to the emitter of emitter follower transistor 711 by an isolating diode 712, rendered conducting only during each burst interval by the positive-going pulse portion of a gating waveform applied to the transistor 730 base. The degree of conduction, if any, by transistor 730 during the gating interval (i.e., the burst interval) is dependent upon a comparison of the magnitude and polarity of the gated R-Y demodulator output with the magnitude and polarity of the emitter bias selected by adjustment of potentiometer 750 (which, as will be shown, performs the function of the manual chroma control 75 of the FIG. 1 system). Capacitive feedback between collector and base of transistor 730 reduces high frequency response, to prevent high frequency noise in the gated demodulator output from affecting the ACC voltage to be developed.

When the gated R-Y demodulator output is more positive than the selected emitter bias potential, conduction by ACC input transistor 730 in turn drives the (complementary type) ACC output transistor 731 into conduction, charging filter capacitor 732 in its collector circuit. The voltage developed across capacitor 732, representing an integration of successive output pulses of transistor 731, causes a current to flow via the series combination of resistor 735, diode 733, resistor 736 and diode 192 into the base of the amplifier transistor 190 of the bandpass amplifier 19 (to be described in detail subsequently).

When the difference between the gated demodulator output and the selected emitter bias potential is sufficiently small, the voltage across the filter capacitor 732 will be sufficiently small that diode 733 will be reverse biased, permitting no ACC control current flow into the transistor 190 base, leaving transistor 190 in its maximum gain condition determined by fixed biasing parameters. When the burst component delivered to the R-Y demodulator is large enough to increase the gated demodulator output above the aforementioned level at which diode 733 is cut off, a control current will flow into the base of transistor to reduce its gain appropriately.

The above-described ACC action requires the condition that the switching mode of the PAL switch 69 (FIG. 1) controlling the feeding of reference oscillations to demodulator 40 is the correct one, so that the polarity of the gated demodulator output is correct (positive). Also required is that the keyed color killer circuit 77 has placed amplifier 19 in its enabled state for color operation. While a more detailed explanation of keyed color killer circuit 77 will be presented subsequently in connection with FIG. 4, a portion of the killer circuit (comprising transistor 790, which is held cut off when conditions are correct for color operation, and which is conducting during line intervals when conditions are otherwise) has been illustrated in FIG. 3 to permit a full showing of bandpass amplifier 19.

Bandpass amplifier 19 receives signals from an output of video amplifier 15, the latter incorporating an amplifier transistor 150, disposed in grounded base configuration and receiving at its emitter video signals from contrast control 13 and burst bypass circuit 14 (FIG. 1). An output lead from the collector of transistor 150 couples signals therefrom to suitable luminance amplifier circuitry (not illustrated).

The collector of transistor 150 is also connected, by means of the series combination of capacitor 170, coil 171 and the previously mentioned diode 192, to the base of the bandpass amplifier transistor 190. Coil 171 is adjusted for series resonance with capacitor 170 at the subcarrier frequency. A pair of resistors 194 and 195 are connected in series across diode 192, and the emitter-collector path of color killer transistor 790 is connected between negative supply terminal (e.g., −15 volts) and the junction of resistors 194 and 195.

A diode 791 is shunted across the base-emitter path of bandpass amplifier transistor 190, with poling opposite to that of the base-emitter diode. A tuned load is provided for amplifier transistor 190, the primary winding of bandpass transformer 191 being connected in the collector circuit of transistor 190; the secondary winding of transformer 190 couples the amplfier output to the delay line assembly 21 of the FIG. 1 system. DC feedback resistor 193 is coupled between a point in the collector circuit of transistor 190 and the junction of coil 171 and diode 192.

During color operation (when killer transistor 790 is cut off), diode 192 and the base-emitter diode of transistor 190 are forward biased and provide a low impedance return to ground for the series resonant circuit 170, 171. The latter then functions as a frequency selective input circuit for amplifier 19, and also as a subcarrier trap for the circuitry feeding signals to the luminance amplifier (thereby performing the functions of the chroma takeoff and subcarrier trap apparatus 17 of FIG. 1 system). Under these color operation conditions, shunt diode 791 is biased off, and the conductive state of diode 192 permits the feeding of a variable control current from ACC amplifier 73 to the transistor 190 base when appropriate.

When color killer transistor 790 is conducting, however, a substantial change in the biasing conditions for transistor 190 and associated components is brought about. Conduction of killer transistor 790 brings the junction of resistors 194 and 195 to a negative potential. reverse biasing diode 192 and forward biasing shunt diode 791. The reverse biasing of diode 192 blocks the passage of signals to transistor 190, and the conduction of diode 791 holds transistor 190 in a cutoff condition. No low impedance return to AC ground is provided for the series resonant circuit 170, 171, whereby its effectiveness as a subcarrier trap for the luminance channel is eliminated. Diode 734 is rendered conducting under the altered biasing conditions to preclude the ACC filter capacitor 732 from changing to a negative potential.

Figure 4:
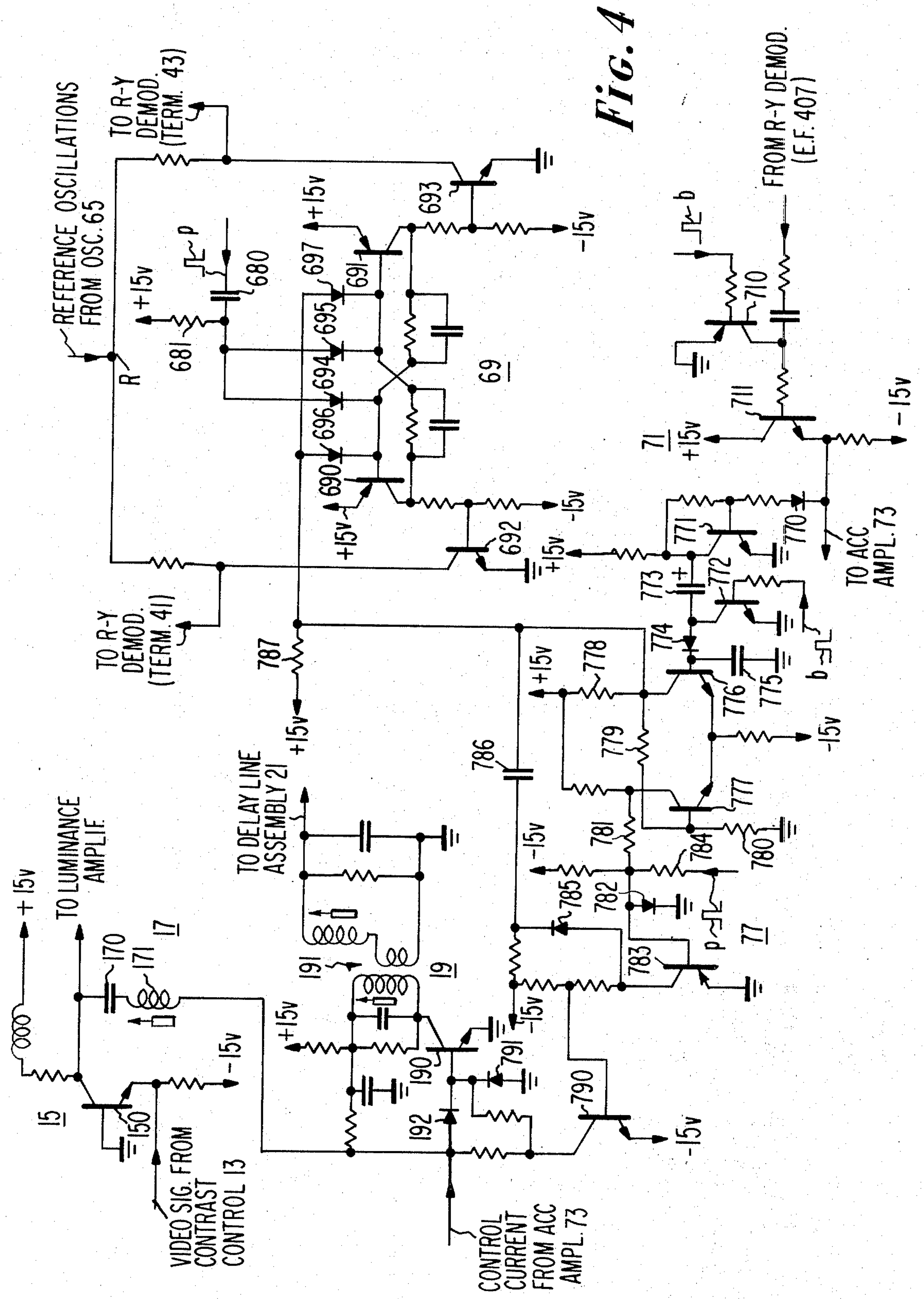
FIG. 4 depicts schematically illustrative apparatus for performing the color killer (and associated PAL switch resetting, and color subcarrier trap switching) functions in the system of FIG. 1.

FIG. 4 provides, in schematic detail, an illustration of particular circuit arrangements that may advantageously be employed for further portions of the FIG. 1 system, particularly including the keyed color killer circuit 77 and the PAL switch apparatus 69. Also repeated in FIG. 4 are illustrative circuit arrangements for system components 15, 19 and 71 to aid in an explanation of the color killer operation.

As previously explained, the keying of gate transistor 710 into cutoff during each burst interval permits emitter follower transistor 711 to respond only to the burst interval portion of the output of the R-Y demodulator 40 (FIGS. 1 and 3). The emitter of transistor 711 is linked not only to the previously described ACC amplifier circuitry (FIG. 3) but also, via a path including compensating diode 770, to the base of feedback amplifier transistor 771.

The collector of amplifier transistor 771 is coupled by means of the series combination of storage capacitor 773 and diode 774 to the base of a succeeding amplifier transistor 776. The emitter-collector path of a gating transistor 772 is connected between ground and the junction of capacitor 773 and diode 774. Gating transistor 772 is rendered conducting during the burst interval only by the positive-going pulse portion *b* of the gating waveform applied to its base. The conduction of gating transistor short circuits one terminal of storage capacitor 773 to ground during the burst interval, so that the burst interval output of R-Y demodulator 40 is integrated by capacitor 773. During the succeeding line interval, when gating transistor 772 is cutoff, the voltage developed across capacitor 773 (charge reduction caused by the detected burst integration) is transferred via diode 774 to capacitor 775, connected between ground and the base of transistor 776.

Transistor 776 is disposed in a differential amplifier configuration with an additional amplifier transistor 777, the emitters of transistors 776 and 777 being returned to a negative bias supply terminal (e.g., −15 volts) via a common emitter resistor. The collector of transistor 776 is connected to a positive bias supply terminal (e.g., −15 volts) by me ıns of a collector resistor 778. The collector of transistor 766 is also cross-coupled to the base of transistor 777 by means of resistor 779. Resistor 780 is connected between the base of transistor 777 and ground.

Due to the presence of cross coupling resistor 779, the differential amplifier has only two stable states. In the absence of a signal input to the base of transistor 776, transistor 777 is in saturation and transistor 776 is cutoff. However, when the gated R-Y demodulator output is such that a positive potential appears across capacitor 775 with adequate magnitude relative to a threshold determined by the divider 778, 779, 780, the differential amplifier switches to its other stable state in which transistor 776 is in saturation and transistor 777 is cutoff. The latter condition is established only when the received signal includes synchronizing bursts of adequate amplitude, reference oscillator 65 is properly synchronized in phase, and PAL switch 69 is operating in the correct mode.

A resistor 781 links the collector of transistor 777 to the base of transistor 783 (complementary in type to transistor 777); the base of the previously mentioned kiler transistor 790 (similar in type to transistor 777) is connected to a point in the collector circuit of transistor 783. When transistor 777 is cutoff (i.e., when conditions are correct for color operation, as indicated by the R-Y demodulator output during the burst interval). the other transistors of the complementary cascade chain (783, 790) are likewise driven to cutoff. As previously noted, the result of cutoff of transistor 790 is the forward biasing of diode 192 and the base-emitter path of band pass amplifier transistor 190, with the consequence that bandpass amplifier 19 is fully enabled and responds to signals selectively passed by chroma takeoff circuit elements 170, 171 and conducting diode 192; elements 170, 171 are also effective as a subcarrier trap for the luminance channel under these conditions.

When transistor 777 is in saturation, however, in the absence of an indication of correct operating conditions by the gated R-Y demodulator output, the other transistors of the complementary cascade chain (783,790) are also in saturation. The effects of conduction by killer transistor 790 have been previously described: cutoff of diode 192 to bar signal passage to the transistor 190 base and to eliminate the effectiveness of elements 170, 171 as a subcarrier trap, and forward biasing of diode 791 to hold transistor 190 in cutoff.

When killer transistor 790 is conducting to establish the disabled state for bandpass amplifier 19, thereby barring color operation, means must be provided to permit the system to recover from the disabled state when appropriate. For this purpose, a gating waveform, having a positive-going pulse portion *p* occurring during each inter-line blanking interval, is applied to the base of transistor 783 via a resistor 784, forward biasing the diode 782 (coupled across the base-emitter path of transistor 783 with opposite poling to that of base-emitter diode) during the blanking interval. The pulse application ensures that transistors 783 and 790 are cut off during each interline blanking interval, independent of the conducting state of transistor 777, whereby bandpass amplifier 19 is always in the enabled state for the burst component of a received signal (to be fed on to the demodulators to permit resumption of color operation when appropriate).

A negative-going blanking pulse waveform is developed in the collector circuit of transistor 783 (under color-off conditions) in response to the aforementioned pulse application. This waveform is passed by isolating diode 785 to the series combination of capacitor 786 and resistor 787, the junction of which elements is directly linked to the collector of transistor 776 (cut off during color-off conditions). A differentiated version of the negative-going pulse appears at the junction; the positive-going spike portion of the differentiated waveform, occurring at the end of the inter-line blanking interval, is passed via sterring diodes 696 and 697 to the PAL switch 69 as a reset pulse.

During color-on operation, the saturated state of transistor 783 precludes the inverted blanking pulse development. Additionally, the conduction of transistor 776 reverse biases the sterring diodes 696 and 697 to protect the PAL switch from spurious output variations in the collector circuit of transistor 783, should they occur.

The PAL switch apparatus 69 includes a bistable multivibrator, incorporating transistors 690 and 691 with conventional cross-coupling from collector to base. A triggering waveform, having a positive-going pulse portion *p* occurring during each inter-line blanking interval, is applied to a differentiating circuit formed by the series combination of capacitor 680 and resistor 681. The differentiated waveform appearing at the junction of elements 680, 681 includes positive-going spikes, occurring at the beginning of each inter-line blanking interval, which are passed by steering diodes 694 and 695 to the bases of the multivibrator transistors 690, 691 to effect triggering of the multivibrator between its stable states.

When the multivibrator is in one of its stable states, transistor 690 is heavily conducting while transistor 691 is cut off; in this state, switching transistor 692, complementary in type to transistor 690 and having its base coupled to a point in the collector circuit of transistor 690, is driven into conduction, while switching transistor 693, complementary in type to transistor 691 and having its base coupled to a point in the collector circuit of transistor 691, is driven into cutoff. The collector-emitter path of switching transistor 692 is directly connected between the noninverting reference input terminal 41 of R-Y demodulator 40 and ground, while the collector-emitter path of switching transistor 693 is directly connected between the inverting reference input terminal 43 of R-Y demodulator 40 and ground. Thus in the noted state of the multivibrator, conduction by switching transistor 692 precludes the feeding of R-Y phase reference oscillations in from feed point R to noninverting reference input terminal 41, whereas cutoff of switching transistor 693 permits the feeding of R-Y phase reference oscillations from feed point R to the inverting reference input terminal 43.

When the multivibrator is triggered to its other stable state, transistor 690 (and switching transistor 692) is dirven into cutoff, while transistor 691 (and switching transistor 693) is driven into conduction. In this state, R-Y phase reference oscillations are permitted to feed noninverting reference input terminal 41, but precluded from feeding inverting reference input terminal 43.

In the absence of reset pulse application from transistor 783, the trigger pulse application via diodes 694, 695 effects a line-by-line reversal of the effective angle of demodulation employed in the R-Y demodulator. When this line-by-line reversal is carried out in the incorrect mode, the reset pulse application permits alteration to the correct mode. It will be noted that when a monochrome signal, lacking a burst component, is received, continued reset pulse application ensures, with the consequence that the phase reversing effect will be overcome during successive line intervals to reduce the possibility of undesired "Hanover bar" type disturbances of the displayed monochrome image.

While specific circuit arrangements have been illustrated for the various components of the FIG. 1 system, it will be appreciated that these are given by way of example, and a variety of other specific circuit arrangements may be substituted therefor in carrying out the principles of the invention. It will also be appreciated that various portions of the system of FIG. 1 may be advantageously employed, with different techniques than those described employed in performing the remaining functions.

What is claimed is:

1. In apparatus for processing PAL-type encoded color television signals, the combination comprising:

means for deriving from said encoded color television signals, during successive line intervals, subcarrier sideband components representative of a B-Y color difference signal to the substantial exclusion of accompanying subcarrier sideband components representative of an R-Y color-difference signal, and, during successive inter-line burst intervals, a constant-phase B-Y synchronizing burst component to the substantial exclusion of an accompanying R-Y synchronizing burst component;

synchronous demodulation means responsive to the output of said component deriving means and having an output terminal;

a source of reference oscillations of subcarrier frequency and controllable phase;

means coupled to said source of reference oscillations for supplying reference oscillations to said synchronous demodulation means in a first phase during successive line intervals and in a second phase, in quadrature to said first phase, during successive inter-line burst intervals;

means coupled to said source for cntrolling the phase of the reference oscillations provided by said source; and means, including signal gating means coupled to said output terminal, for rendering said phase controlling means responsive to that portion of the output of said synchronous demodulation means developed during said inter-line burst intervals.

2. Apparatus in accordance with claim 1, also including:

second means for deriving from said encoded color television signals, during said line intervals, subcarrier sideband components representative of an R-Y color-difference signal to the substantial exclusion of accompanying subcarrier sideband components representative of a B-Y color-difference signal, and, during said burst intervals, an R-Y burst synchronizing component, subject to phase reversal in successive burst intervals, to the substantial exclusion of an accompanying B-Y synchronizing component;

second synchronous demodulation means responsive to the output of said second component deriving means and having a second output terminal;

second means coupled to said source of reference oscillations for supplying reference oscillations to said second synchronous demodulation means;

frequency selective amplifier means for supplying an input signal to said first and second component deriving means;

means for controlling the gain of said frequency selective amplifier means; and means, including second signal gating means coupled to said second output terminal, for rendering said gain controlling means responsive to that portion of the output of said second synchronous demodulation means developed during said inter-line burst intervals.

3. Apparatus in accordance with claim 2, also including:

means for alternatively enabling or disabling said frequency selective amplifier means; and means, including said second signal gating means, for rendering said enabling/disabling means responsive to that portion of the output of said second synchronous demodulation means developed during said inter-line burst intervals.

4. Apparatus in accordance with claim 2, also including a luminance signal path;

means for optionally subjecting the signals in said luminance signal path to subcarrier frequency trapping;

and means, including said second signal gating means coupled to said second signal output terminal, for rendering said trapping means responsive to that portion of the output of said second synchronous demodulation means developed during said inter-line burst intervals.

5. Apparatus in accordance with claim 2, wherein said second reference oscillation supplying means includes means for reversing the phase of the supplied reference oscillation in alternate line intervals, and wherein said apparatus also includes:

means for controlling the mode of operation of said phase reversing means; and means, including said second signal gating means coupled to said second output terminal, for rendering said mode controlling means responsive to that portion of the output of said second synchronous demodulation means developed during said inter-line burst intervals.

6. Apparatus in accordance with claim 5, also including a source of line rate triggering pulses; and wherein said mode controlling means includes a bistable multivibrator, subject to triggering between first and second stable states in response to pulses from said line rate triggering pulse source, for developing switching waveforms, said reference oscillation phase reversing means being responsive to said switching waveforms; and wherein said means for rendering said mode controlling means responsive to an output of said second synchronous demodulation means includes: a source of line rate reset pulses; means for applying pulses from said reset pulse source to said bistable multivibratpr; and means, coupled to the output of said second signal gating means and responsive to that portion of the output of said second synchronous demodulation means developed during said inter-line burst intervals, for disabling said reset pulse applying means when the output of said second signal gating means is indicative of the presence in the output of said second deriving means of an R-Y synchronizing burst component subject to phase reversal in successive burst intervals in a sense bearing a desired relationship to the sense of phase reversal of reference oscillations effected by said phase reversing means.

7. Apparatus in accordance with claim 6, also including:

means, responsive to the output of said second signal gating means, for (1) enabling the operation of said frequency selective amplifier means when the output of said second signal gating means is indicative of the presence in the output of said second deriving means of an R-Y synchronizing burst component subject to phase reversal in successive burst intervals in a sense bearing said desired relationship to the sense of reference oscillation phase reversal, and (2) applying a disabling bias to said frequency selective amplifier means when the output of said second signal gating means fails to indicate such component presence; and means, coupled to said source of line rate reset pulses, for applying enabling pulses to said frequency selective amplifier means to overcome said disabling bias during said inter-line burst intervals, said enabling pulse applying means being responsive to the output of said second signal gating means and subject to actuation whenever the output of said second signal gating means fails to indicate such component presence.

* * * * *